US007575790B2

(12) United States Patent
Terada et al.

(10) Patent No.: US 7,575,790 B2
(45) Date of Patent: Aug. 18, 2009

(54) CLEANING SHEET AND PROCESS FOR CLEANING SUBSTRATE TREATMENT DEVICE USING SAME

(75) Inventors: Yoshio Terada, Osaka (JP); Makoto Namikawa, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/497,469

(22) PCT Filed: Oct. 31, 2002

(86) PCT No.: PCT/JP02/11398

§ 371 (c)(1), (2), (4) Date: Jun. 2, 2004

(87) PCT Pub. No.: WO03/052045

PCT Pub. Date: Jun. 26, 2003

(65) Prior Publication Data

US 2005/0048241 A1 Mar. 3, 2005

(30) Foreign Application Priority Data

Dec. 19, 2001 (JP) ............................ 2001-386708
Dec. 25, 2001 (JP) ............................ 2001-391298

(51) Int. Cl.

| | |
|---|---|
| ***B32B 9/00*** | (2006.01) |
| ***B32B 33/00*** | (2006.01) |
| ***B32B 7/12*** | (2006.01) |
| ***B32B 15/04*** | (2006.01) |
| ***B05D 5/10*** | (2006.01) |

(52) U.S. Cl. .................... 428/40.1; 428/41.3; 428/41.4; 428/41.7; 428/41.8; 428/352; 428/354; 427/207.1; 427/208

(58) Field of Classification Search ................ 428/40.1, 428/41.4, 41.3, 41.5, 41.7, 41.8, 41.9, 352, 428/354; 427/208, 207.1
See application file for complete search history.

(56) References Cited

U.S. PATENT DOCUMENTS

| | | | | |
|---|---|---|---|---|
| 5,891,259 | A | 4/1999 | Ikeda et al. | |
| 6,277,457 | B1 * | 8/2001 | Onishi et al. ............... | 428/40.1 |
| 2003/0136430 | A1 * | 7/2003 | Namikawa et al. ............ | 134/32 |
| 2004/0007252 | A1 * | 1/2004 | Namikawa et al. ............ | 134/6 |

FOREIGN PATENT DOCUMENTS

| | | |
|---|---|---|
| JP | 2001-134186 | 5/2001 |
| WO | WO 01 94036 A1 | 12/2001 |
| WO | WO 02 083332 A1 | 10/2002 |

OTHER PUBLICATIONS

Database WPI Section PQ, Week 200221 Derwent Publications Ltd., London, GB; AN 2002-157415 XP002232477.

(Continued)

*Primary Examiner*—Patricia L Nordmeyer
(74) *Attorney, Agent, or Firm*—Sughrue Mion, PLLC

(57) ABSTRACT

A cleaning sheet comprising: a cleaning layer; and a protective film treated with a releasing agent comprising a silicone, the protective film being provided as a separator on at least one side of the cleaning layer, wherein an amount of silicone attached to the cleaning layer when the separator is peeled off from the cleaning layer is 0.005 g/m$^2$ or less as calculated in terms of polydimethylsiloxane.

26 Claims, 1 Drawing Sheet

OTHER PUBLICATIONS

Patent Abstracts of Japan vol. 018, No. 689 (p. 1850), Dec. 26, 1994 (Sanrei Giken: KK).
Database WPI Section EI, Week 199833 Derwent Publications Ltd., London, GB; AN 1998-383174 XP002232478.
Database WPI Section Ch, Week 199136 Derwent Publications Ltd., London, GB; AN 1991-262539 XP002232479.
International Search Report for PCT/JP02/11398 dated Mar. 10, 2003.

* cited by examiner

CLEANING SHEET AND PROCESS FOR CLEANING SUBSTRATE TREATMENT DEVICE USING SAME

TECHNICAL FIELD

The present invention relates to a sheet for cleaning a device and more particularly to a cleaning sheet and cleaning process for substrate treatment device apt to be easily damaged by foreign matters such as semiconductor or flat panel display producing device and semiconductor or flat panel display inspection device.

BACKGROUND ART

A substrate treatment device conveys various conveyance systems and substrates which are in physical contact with each other. During this procedure, when foreign matters are attached to the substrate or conveyance system, the subsequent substrates can be successively contaminated, making it necessary to suspend the operation of the device and clean the device at regular intervals. This brought forth a problem that the working efficiency is lowered or much labor is required. In order to solve these problems, a process which comprises conveying a substrate having an adhesive material fixed thereto to clean away foreign matters attached to the interior of the substrate treatment device (Japanese Patent Laid-Open No. 1998-154686) and a process which comprises conveying a tabular member to remove foreign matters attached to the back surface of the substrate (Japanese Patent Laid-Open No. 1999-87458) have been proposed.

DISCLOSURE OF THE INVENTION

The process which comprises conveying a substrate having an adhesive material fixed thereto to clean away foreign matters attached to the interior of the substrate treatment device is an effective process for overcoming the aforementioned problems. However, in accordance with this process, since an adhesive material is used as a cleaning layer, it is likely that the adhesive material can be so firmly bonded to the contact area of the device that it cannot be peeled off the contact area, making it impossible to certainly convey the substrate. This problem is particularly remarkable when the chuck table of the device comprises a vacuum suction mechanism.

Further, the process which comprises conveying a tabular member to remove foreign matters can perform conveyance without any troubles but is disadvantageous in that the removing capacity, which is important, is poor.

Moreover, it is desired that the cleaning sheet for use in the removal of these foreign matters be composed of a cleaning layer which causes no contamination on the conveying site, etc. in the substrate treatment device. The separator to be stuck to the cleaning layer needs to be given similar consideration. In other words, the cleaning sheet is normally arranged such that the separator is stuck to the surface of the cleaning layer to protect the surface of the cleaning layer or improve the handleability thereof. As this separator there is often used a polyester film or the like which has been release-treated with silicone, wax or the like from the standpoint of releasability.

However, when the aforementioned separator is peeled off the cleaning layer during use, the release treatment such as silicone and wax moves to the cleaning layer. When this cleaning sheet is conveyed into the substrate treatment device in an attempt to remove foreign matters, the aforementioned release treatment transferred is attached to the conveying site, etc. in the device, contaminating the device to disadvantage.

Therefore, it has been heretofore practiced to use a cleaning layer surface protective film made of a polyolefin-based resin instead of the aforementioned separator. This kind of a film itself can exhibit a sufficient releasability even without being release-treated with silicone, wax or the like and thus can prevent contamination of the device. However, in the case where the cleaning sheet is used in a device having a temperature of about 80° C. or like cases, a problem arises that the interior of the device is still contaminated for the reason that various additives which have been added during the film-forming of the polyolefin-based resin move to the cleaning layer and then are gasified or react with the remaining gas in the device.

The first and second inventions have an object of providing a cleaning sheet which can be certainly conveyed through the substrate treatment device to simply and certainly remove foreign matters attached thereto.

Further, referring to the aforementioned process for the production of the conveying member with cleaning function, in the case where a cleaning sheet is stuck to a conveying member such as substrate to produce a cleaning member, when a cleaning sheet having a size greater than the shape of the conveying member is stuck to the conveying member, and then cut along the contour of the conveying member (hereinafter referred to as "direct cutting process"), chips are produced from the cleaning layer, etc. during sheet cutting and then attached to the cleaning member and the device to disadvantage. Further, in the case where a cleaning label sheet which has been previously worked into a member form is stuck to a conveying member to produce a cleaning member (hereinafter referred to as "precutting process"), the production of chips during label working can be suppressed as compared with direct cutting process, but the adhesive of the cleaning layer protrudes from the cutting section during label cutting, making it likely that the adhesive can be attached to the end of the label. Moreover, in the case where as the adhesive there is used a polymerization-curing adhesive, when curing is effected after sheet cutting, the adhesive at the cut end undergoes malcuring due to oxygen inhibition, possibly causing contamination on the contact site in the substrate treatment device.

In addition, in the case where the label sheet is punched, the cleaning label is continuously prepared in the form of separator of continuous length with an ordinary adhesive interposed therebetween. However, in this case, when as the cleaning layer there is used an adhesive which is polymerized and cured when given an activation energy, the cleaning layer undergoes hardening and shrinkage, causing the label itself to be easily peeled off the separator. When the peel adhesion between the separator and the adhesive is small, the cleaning label can be peeled off the separator. Further, when the release layer of the separator for retaining the label is unstable, the peel adhesion of the release layer can change during storage or the constituents of the release layer can move to the surface of the adhesive layer, deteriorating the adhesive properties of the label. In worst cases, the label can be peeled off the conveying member during the use of the cleaning member, causing errors in the device.

In addition, in the case where curing is effected before sheet punching, particularly in the case where a silicone releasing agent is used as a release film for the surface protection of the cleaning layer, said silicone component can move to the surface of the cleaning layer.

Under these circumstances, the third invention has an object of providing a label sheet with cleaning function which can be certainly conveyed through the substrate treatment device to simply and certainly remove foreign matters attached to the device without causing peeling of cleaning label off separator in precutting process and is excellent in age stability and adhesive properties of label.

Further, under these circumstances, the fourth invention has an object of providing a process for the production of a label sheet with cleaning function which allows a substrate to be certainly conveyed through the substrate treatment device, making it possible to simply and certainly remove foreign matters attached to the interior of the device, and causes neither malpunching during sheet punching nor malcuring of adhesive in precutting process.

The inventors made extensive studies of the aforementioned objects. As a result, it was found that the use of the first invention which is a protective film release-treated with a silicone-based releasing agent laminated as a separator wherein the amount of silicone attached to said cleaning layer when said separator is peeled off said cleaning layer is 0.005 $g/m^2$ or less as calculated in terms of polydimethylsiloxane and the coated amount of silicone on said separator is 0.1 $g/m^2$ or less as calculated in terms of polydimethylsiloxane as a protective film for protecting said cleaning layer when the interior of a device is cleaned to remove foreign matters attached thereto by conveying a conveying member such as sheet having a cleaning layer and substrate having such a sheet fixed thereto into the device makes it possible to certainly prevent problems of contamination on the device due to separator and peel foreign matters simply and certainly without causing the aforementioned problems. Thus, the present invention has been worked out.

As the second invention, it was found that the use of an untreated protective film made of a polyolefin-based resin laminated as a separator wherein the sum of the amount of a heat deterioration inhibitor and a lubricant incorporated in the protective film is less than 0.01 parts by weight based on 100 parts by weight of polyolefin-based resin as the aforementioned protective film for protecting the cleaning layer makes it possible to certainly prevent problems of contamination on the device due to separator and peel foreign matters simply and certainly without causing the aforementioned problems. Thus, the present invention has been worked out.

As the fourth invention, the inventors made extensive studies to accomplish the aforementioned objects. As a result, it was found that the use of a precutting process for the production of a label sheet with cleaning function comprising a cleaning layer made of an adhesive which undergoes polymerization and curing when given an activation energy which comprises peeling a first release film of the cleaning layer before the polymerization curing reaction of the adhesive of the cleaning layer, subjecting the cleaning layer to polymerization curing under conditions that there are no substantial effect of oxygen, protecting the surface of said cleaning layer by a second release film, and then cutting the label makes it possible to produce a label sheet with cleaning function which can remove foreign matters simply and certainly without causing the aforementioned problems. Thus, the present invention has been worked out.

In other words, the first essence of the present invention concerns a cleaning sheet comprising a cleaning layer and a protective film release-treated with a silicone-based releasing agent laminated as a separator on at least one side thereof, characterized in that the amount of silicone attached to said cleaning layer when said separator is peeled off said cleaning layer is 0.005 $g/m^2$ or less as calculated in terms of polydimethylsiloxane, a cleaning sheet comprising a cleaning layer and a protective film release-treated with a silicone-based releasing agent laminated as a separator on at least one side thereof, characterized in that as said separator there is used a separator coated with a silicone in an amount of 0.1 $g/m^2$ or less as calculated in terms of polydimethylsiloxane, a cleaning sheet comprising a cleaning layer and a protective film release-treated with a silicone-based releasing agent laminated as a separator on at least one side thereat characterized in that the amount of silicone attached to said cleaning layer when said separator is peeled off said cleaning layer is 0.005 $g/m^2$ or less as calculated in terms of polydimethylsiloxane and there is provided an ordinary adhesive layer provided on the other side of said cleaning layer, a cleaning sheet comprising a cleaning layer and a protective film release-treated with a silicone-based releasing agent laminated as a separator on at least one side thereof, characterized in that as said separator there is used a separator coated with a silicone in an amount of 0.1 $g/m^2$ or less as calculated in terms of polydimethylsiloxane and there is provided an ordinary adhesive layer provided on the other side of said cleaning layer, a cleaning sheet comprising a cleaning layer provided on at least one side of a backing and a protective film release-treated with a silicone-based releasing agent laminated as a separator thereon, characterized in that the amount of silicone attached to said cleaning layer when said separator is peeled off said cleaning layer is 0.005 $g/m^2$ or less as calculated in terms of polydimethylsiloxane, a cleaning sheet comprising a cleaning layer provided on at least one side of a backing and a protective film release-treated with a silicone-based releasing agent laminated as a separator thereon, characterized in that as said separator there is used a separator coated with a silicone in an amount of 0.1 $g/m^2$ or less as calculated in terms of polydimethylsiloxane, a cleaning sheet comprising a cleaning layer provided on at least one side of a backing, an ordinary adhesive layer provided on the other side of said backing and a protective film release-treated with a silicone-based releasing agent laminated as a separator on at least the surface of said cleaning layer, characterized in that the amount of silicone attached to said cleaning layer when said separator is peeled off said cleaning layer is 0.005 $g/m^2$ or less as calculated in terms of polydimethylsiloxane, a cleaning sheet comprising a cleaning layer provided on at least one side of a backing, an ordinary adhesive layer provided on the other side of said backing and a protective film release-treated with a silicone-based releasing agent laminated as a separator on at least the surface of said cleaning layer, characterized in that as said separator there is used a separator coated with a silicone in an amount of 0.1 $g/m^2$ or less as calculated in terms of polydimethylsiloxane, etc.

The second essence of the present invention concerns a cleaning sheet comprising an untreated protective film made of a polyolefin-based resin laminated as a separator on at least one side of a cleaning layer, wherein the sum of the amount of a heat deterioration inhibitor and a lubricant incorporated in this protective film is less than 0.01 parts by weight based on 100 parts by weight of polyolefin-based resin, a cleaning sheet comprising an untreated protective film made of a polyolefin-based resin laminated as a separator on one side of a cleaning layer, wherein the sum of the amount of a heat deterioration inhibitor and a lubricant incorporated in this protective film is less than 0.01 parts by weight based on 100 parts by weight of polyolefin-based resin and there is provided an ordinary adhesive layer provided on the other side of said cleaning layer, a cleaning sheet comprising a cleaning layer provided on at least one side of a backing and an untreated protective film made of a polyolefin-based resin laminated as a separator on the surface of said cleaning layer, wherein the sum of the amount of a heat deterioration inhibitor and a lubricant incorporated in this protective film is less than 0.01 parts by weight based on 100 parts by weight of polyolefin-based resin, a cleaning sheet comprising a cleaning layer provided on one side of a backing, an ordinary adhesive layer provided on the side of said backing and an untreated protective film made of a polyolefin-based resin laminated as a separator on at least the surface of said cleaning layer, wherein the sum of the amount of a heat deterioration inhibitor and a lubricant incorporated in this protective film is less than 0.01 parts by weight based on 100 parts by weight of polyolefin-based resin, a cleaning sheet, wherein said protective film is free of heat deterioration inhibitor and lubricant, etc.

The third essence of the present invention concerns a label sheet with cleaning function comprising a cleaning layer provided on one side of a backing with its surface protected by a release film and wherein the other side of said backing is continuously provided peelably apart from each other on a separator of continuous length with an ordinary adhesive layer interposed therebetween, characterized in that the 180° peel adhesion required to peel said separator off said ordinary adhesive layer is 0.05 N/50 mm or more, a label sheet with cleaning function comprising a cleaning layer provided on one side of a backing with its surface protected by a release film wherein the other side of said backing is continuously provided peelably apart from each other on a separator of continuous length with an ordinary adhesive layer interposed therebetween, characterized in that as said separator there is used a separator having a percent residual adhesion of 85% or more as determined by No. 31 B tape produced by NITTO DENKO CORPORATION, a label sheet with cleaning function, wherein the tensile modulus of said cleaning layer (according to JIS K7127 testing method) is 10 Mpa or more, a label sheet with cleaning function, comprising a cleaning sheet having a cleaning layer made of a curing adhesive containing a pressure-sensitive adhesive polymer, a polymerizable unsaturated compound having one or more unsaturated double bonds per molecule and a polymerization initiator, a label sheet with cleaning function, wherein the pressure-sensitive adhesive is an acrylic polymer comprising a (meth) acrylic acid alkylester as a main monomer, a label sheet with cleaning function, wherein the polymerization initiator is a photopolymerization initiator and the cleaning layer is a photo-setting (photo-curing) adhesive layer, etc.

The fourth essence of the present invention concerns a process for the production of a label sheet with cleaning function comprising a cleaning layer made of an adhesive which undergoes polymerization and curing when given an activation energy on one side of a backing with the surface thereof protected by a release film wherein the other side of said backing is peelably provided on a separator with an ordinary adhesive layer interposed therebetween, characterized in that the amount of foreign matters having a size of 0.2 μm or more transferred from the cleaning layer of the label sheet thus obtained to a silicon wafer is 20 pieces/in$^2$ or less, a process for the production of a label sheet with cleaning function comprising a cleaning layer made of an adhesive which undergoes polymerization and curing when given an activation energy on one side of a backing with the surface thereof protected by a release film wherein the other side of said backing is peelably provided on a separator with an ordinary adhesive layer interposed therebetween, which comprises peeling a first release film of the cleaning layer before the polymerization curing reaction of the adhesive of said cleaning layer, subjecting the cleaning layer to polymerization curing under conditions that there are no substantial effect of oxygen, protecting the surface of said cleaning layer by a second release film, and then punching the sheet into a label form, a process for the production of a label sheet with cleaning function, wherein the first release film which protects the surface of the cleaning layer before the polymerization curing reaction of the adhesive of the cleaning layer is a film with silicone-based releasing agent, a process for the production of a label sheet with cleaning function, wherein the tensile modulus of the cleaning layer during punching of the sheet into a label form (according to JIS K7127 testing method) is 10 MPa or more, a process for the production of a label sheet with cleaning function, wherein the cleaning layer is a curing adhesive containing a pressure-sensitive adhesive polymer, a polymerizable unsaturated compound having one or more unsaturated double bonds per molecule and a polymerization initiator, a process for the production of a label sheet with cleaning function, wherein the pressure-sensitive adhesive polymer is an acrylic polymer comprising a (meth) acrylic acid and/or (meth)acrylic acid alkylester as a main monomer, a process for the production of a label sheet with cleaning function, wherein the polymerization initiator is a photopolymerization initiator and the cleaning layer is a photo-setting adhesive layer, etc.

Figure 1:
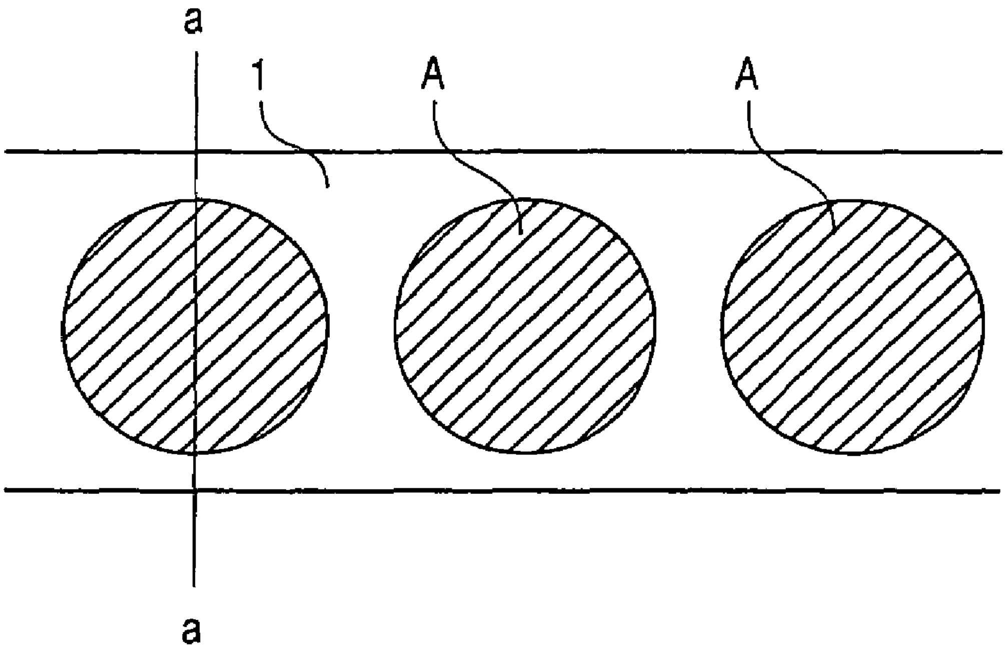
FIG. 1 is a plan view illustrating an embodiment of the label sheet with cleaning function of the present invention.

1: Separator, A: Cleaning label, 2: Backing, 3: Cleaning layer, 4: Release film, 5: Ordinary adhesive layer The first cleaning sheet of the present invention comprises a separator release-treated with a silicone-based releasing agent as a protective film for protecting the surface of the cleaning layer. The said separator to be laminated on the said cleaning layer needs to meet the requirements that the amount of silicone attached to the said cleaning layer when the said separator is peeled off the said cleaning layer be 0.005 g/m$^2$, particularly preferably 0.003 g/m$^2$ as calculated in terms of polydimethylsiloxane. Alternatively, the said separator needs to meet the requirements that the coated amount of silicone on the said separator be 0.1 g/m$^2$ or less, particularly preferably 0.07 g/m$^2$ or less as calculated in terms of polydimethylsiloxane. When the amount of silicone attached to the cleaning layer or the coated amount of silicone on the separator exceeds the aforementioned predetermined value, there arises a problem that the constituents of the release treatment in contact with the outermost surface of the cleaning layer or silicone which is one of the constituents moves to the surface of the cleaning layer to contaminate the cleaning layer, causing secondary contamination of the contact site in the substrate treatment device. The measurement of the amount of silicone can be carried out by measuring the surface of a sample within a 30 mmϕ measurement range for intensity of Si—Kα using a fluorescent X-ray measuring instrument, and then subjecting the measured value to calculation in terms of polydimethylsiloxane. The conversion formula is represented by the following equation (1).

$$y=0.00062x \tag{1}$$

y: Amount of polydimethylsiloxane (g/m$^2$)

x: Intensity of Si—Kα (kcps)

The separator to be used in the present invention is not specifically limited so far as the amount of silicone attached to the cleaning layer or the coated amount of silicone on the separator is not greater than a predetermined value as mentioned above. For example, the silicone resin to be used as a release treatment may be solvent type, emulsion type, solvent-free type or the like. Alternatively, a curing type silicone resin such as condensation reaction curing type, addition reaction curing type, ultraviolet-curing type and electron ray-curing type silicone resins can be used. The silicone resin may further comprise various additives such as non-functional silicone as light stripping additive or silicone resin as heavy stripping additive incorporated therein besides the main component such as polydimethylsiloxane.

The material to be used as separator is not specifically limited but may be a plastic film made of polyvinyl chloride, vinyl chloride copolymer, polyethylene terephthalate, polybutylene terephthalate, polyurethane, ethylene acetate-vinyl copolymer, ionomer resin, ethylene-(meth)acrylic acid copolymer, ethylene-(meth)acrylic acid ester copolymer, polystyrene, polycarbonate or the like.

The second cleaning sheet of the present invention comprises a separator having a thickness of normally from 25 μm to 100 μm made of a polyolefin-based resin as a protective film for protecting the surface of the cleaning layer. Examples of the polyolefin-based resin include polyethylene, polypropylene, ethylene-ethyl acrylate copolymer, etc. This kind of a film such as polyether exhibits a low critical surface tension even if it is not release-treated with a silicone or wax and thus can be predetermined to have a lowered peel adhesion with respect to the surface of the cleaning layer. Further, the film made of a soft vinyl chloride is disadvantageous in that a large amount of a plasticizer incorporated in the film moves to the surface of the cleaning layer to cause contamination in the substrate treatment device or hydrogen chloride which has liberated from the polyvinyl chloride causes contamination in the device. However, the polyolefin-based resin causes no such problems.

Such a cleaning layer surface protective film is prepared by normally adding various additives to the aforementioned polyolefin-based resin, and then working the polyolefin-based resin into a film form by a film-forming device such as extruder and calender. The present invention is characterized in that the aforementioned additives are free of heat deterioration inhibitor and lubricant or, if any, the sum of the amount of the two additives is restricted to a range as narrow as less than 0.01 parts by weight based on 100 parts by weight of polyolefin-based resin.

Examples of the heat deterioration inhibitor include phenolic heat deterioration inhibitor, aromatic amine-based heat deterioration inhibitor, organic sulfur-based heat deterioration inhibitor, organic phosphorus-based heat deterioration inhibitor, and metal compound-based heat deterioration inhibitor. When the sum of the amount of the heat deterioration inhibitor and lubricant is not smaller than 0.01 parts by weight based on 100 parts by weight of polyolefin-based resin, these additives move to the surface of the cleaning layer, making it difficult to certainly prevent contamination in the substrate treatment device.

Further, since the protective film made of the aforementioned polyolefin-based resin must withstand the heating and drying step during the coating of the cleaning layer-forming adhesive, the polyolefin-based resin which is a film-forming material preferably exhibits a heat deformation temperature of 80° C. or higher (according to JIS K7207 at a load of 0.45 MPa). Such a protective film is not subjected to release treatment.

The cleaning layer is not specifically limited in its material, etc. However, a material which has cured by an activation energy source such as ultraviolet rays and heat to have a three-dimensionally networked molecular structure that gives a lowered adhesion is preferably used. For example, the 180° peel adhesion with respect to silicon wafer (mirror surface) is 0.20 N/10 mm or less, preferably from about 0.010 to 0.10 N/10 mm. When this adhesion exceeds 0.20 N/10 mm, the cleaning layer adheres to the non-cleaning area in the device during conveyance, possibly causing conveyance troubles.

Further, in the present invention, the cleaning sheet can be cut into a label form which is then used as a label sheet with cleaning function. In this case, the cutting method is not specifically limited. However, when the adhesive of the cleaning layer has not been polymerized and cured, it is disadvantageous in that the adhesive layer of the cleaning layer protrudes from the cutting section of the sheet or is attached to the cutting section or the adhesive ropes or is cut to uneven depth to give roughened cutting section, causing malcutting in the worst case. Further, when the polymerization curing reaction is effected after the cutting of the sheet, the adhesive exposed on the cutting section is prevented from being polymerized due to oxygen inhibition, occasionally causing contamination of the substrate treatment device by the adhesive. Therefore, it is preferred that polymerization curing reaction be previously effected before cutting. To this end, it is preferred that the tensile modules of the cleaning layer be 10 MPa or more, preferably from 10 to 2,000 Mpa (according to JIS K7127) to prevent the occurrence of the aforementioned problems with sheet cutting. By predetermining the tensile modulus to such a specified value or more, the protrusion of the adhesive from the cleaning layer or malcutting during label cutting can be prevented, making it possible to produce a label sheet with cleaning function causing no contamination by adhesive. When the tensile modulus exceeds 2,000 Mpa, the capacity of removing attached foreign matters from the conveyance system is deteriorated. When the tensile modulus is smaller than this range, the aforementioned problems with cutting can occur or the adhesive can adhere to the area to be cleaned in the device during conveyance, possibly causing troubles in conveyance.

As a specific example of such a cleaning layer, a cleaning layer comprising a compound having one or more unsaturated double bonds per molecule incorporated in a pressure-sensitive adhesive polymer is preferred.

Further, an examples of such a pressure-sensitive adhesive polymer is an acrylic polymer comprising as a monomer a (meth)acrylic acid and/or (meth)acrylic acid ester selected from the group consisting of acrylic acid, acrylic acid ester, methacrylic acid and methacrylic acid ester. By using a compound having two or more unsaturated double bonds per molecule as a copolymerizable monomer to synthesize this acrylic polymer or chemically bonding a compound having unsaturated double bonds per molecule to the acrylic polymer synthesized by a reaction between functional groups so that the acrylic polymer molecule comprises unsaturated double bonds incorporated therein, the polymer itself, too, can be allowed to take part in the polymerization curing reaction when given an activation energy.

The compound having one or more unsaturated double bonds per molecule to be used herein (hereinafter referred to as "polymerizable unsaturated compound") is preferably a nonvolatile low molecular compound having a weight-average molecular weight of 10,000 or less. It is preferred that this compound have a molecular weight of 5,000 or less to undergo efficient three-dimensional networking of adhesive layer during curing. Examples of such a polymerizable compound include phenoxy polyethylene glycol (meth)acrylate, ε-caprolactone (meth)acrylate, polyethylene glycol di(meth)

acrylate, polypropylene glycol di(meth)acrylate, trimethylolpropane tri(meth)acrylate, dipentaerythritol hexa(meth)acrylate, urethane (meth)acrylate, epoxy (meth)acrylate, oligoester (meth)acrylate, etc. Among these polymerizable compounds, one or more compounds are used.

Further, the polymerization initiator to be incorporated in the adhesive is not specifically limited. Any known material may be used as such a polymerization initiator. For example, if as an activation energy source there is used heat, a heat polymerization initiator such as benzoyl peroxide and azobisisobutyronitrile may be used. If light is used, a photopolymerization initiator such as benzoyl, benzoin ethyl ether, dibenzyl, isopropyl benzoin ether, benzophenone, Michler's ketone chlorothioxanthone, dodecyl thioxanthone, dimethyl thioxanthone, acetophenone diethyl ketal, benzyl dimethyl ketal, α-hydroxy cyclohexyl phenyl ketone, 2-hydroxymetyl phenyl propane and 2,2-dimethoxy-2-phenylacetophenone may be used.

The thickness of the cleaning layer is not specifically limited but is normally from about 5 to 100 μm.

The present invention also provides a cleaning sheet comprising an ordinary adhesive layer provided on the other side of the cleaning layer or the other side of the backing. In this case, the adhesive layer on the other side is not specifically limited in its material, etc. so far as it satisfies sticking function. An ordinary adhesive (e.g., acrylic adhesive, rubber-based adhesive) may be used. The thickness of the adhesive layer is normally from about 5 to 100 μm. In the case where a conveying member such as substrate is peeled off such an adhesive to reuse a conveying member such as substrate in the present invention, the adhesion of such an ordinary adhesive is preferably from about 0.21 to 0.98 N/10 mm, particularly from about 0.40 to 0.98 N/10 mm as calculated in terms of 180° peel adhesion with respect to silicon wafer (mirror surface) so that the substrate can be easily re-peeled without being peeled during conveyance after cleaning.

The separator to be used in the adhesive layer on the other is not specifically limited. Examples of the separator include plastic film made of polyolefin such as polyethylene, polypropylene, polybutene, polybutadiene and polymethyl pentene, polyvinyl chloride, vinyl chloride copolymer, polyethylene terephthalate, polybutylene terephthalate, polyurethane, ethylene-vinyl acetate copolymer, ionomer resin, ethylene-(meth)acrylic acid copolymer, ethylene-(meth)acrylic acid ester copolymer, polystyrene and polycarbonate which has been release-treated with a silicone-based releasing agent, long-chain alkyl-based releasing agent, fluorine-based releasing agent, aliphatic acid amide-based releasing agent, silica-based releasing agent or the like. The thickness of the separator is normally from about 10 to 100 μm.

The backing for the cleaning layer is not specifically limited. Examples of the backing include plastic film made of polyethylene, polyethylene terephthalate, acetyl cellulose, polycarbonate, polypropylene, polyimide, polyamide, polycarbodiimide, nylon film, etc. The thickness of the backing film is normally from about 10 μm to 100 μm.

In the third label sheet with cleaning function of the present invention, the separator of continuous length needs to have a 180° peel adhesion of 0.05 N/50 mm or more, preferably 0.1 N/50 mm or more, particularly from about 0.1 to 0.5 N/50 mm to peel itself off the ordinary adhesive layer. Alternatively, the said separator needs to have a percent residual adhesion of 85% or more, preferably 90% or more, particularly from about 90 to 110% as measured by No. 31 B tape (trade name: polyester adhesive tape; substrate: polyester; adhesive: acryl) produced by NITTO DENKO CORPORATION. The measurement of the peel adhesion of the separator is carried out by determining the force required to peel the separator off the cleaning label at an angle of 180° and a rate of 300 mm/ml in an ordinary state (23° C., 50% RH) using a tensile testing machine (specified in AS1635, FINAT-10, FS-147, PSTC-4). In some detail, a No. 31 B polyester adhesive tape produced by NITTO DENKO CORPORATION is stuck to a cold-rolled stainless steel plate (SUS304) specified in JIS G 4305. The peel adhesion is then measured at an angle of 180° in an ordinary state (23° C., 50% RH) as a basic adhesion ($F_0$). Subsequently, the aforementioned polyester adhesive tape is stuck to the said separator using a 19.6 N (2 kg) roller. The laminate is then pressed at a load of 49 N (5 kg). After 24 hours, the adhesive tape is then peeled. The adhesive tape thus peeled is then stuck to the aforementioned stainless steel plate. The peel adhesion is then measured in the same manner as mentioned above to determine residual adhesion (F). From the basic adhesion ($F_0$) and residual adhesion (F) thus obtained, percent residual adhesion is then determined using the following equation (1):

$$\text{Percent residual adhesion (\%)}=(F/F_0)\times 100 \quad (1)$$

If the 180° peel adhesion of the said separator is less Than the predetermined value, the cleaning label is partly peeled off the separator of continuous length after the production of the label sheet with cleaning function, possibly causing the change of adhesion of the adhesive or the contamination of the adhesive by foreign matters. If the 180° peel adhesion exceeds 0.5 N/50 mm, heavy-duty peeling occurs when the label is peeled off the separator, possibly deteriorating workability. Further, if the percent residual adhesion is smaller than the predetermined value, the release layer components are transferred to the adhesive during the storage of label sheet, possibly deteriorating the adhesive properties of the label or making the peel adhesion of the label with respect to the separator in stable to disadvantage. It is also disadvantageous in that when such a cleaning label is stuck to the conveying member, malsticking occurs due to contamination by foreign matters or the age stability of the conveying member with cleaning function to which the cleaning label has been stuck deteriorates.

In the present invention, the separator of continuous length is not specifically limited in its material so far as the peel adhesion thereof is not smaller than the predetermined value as mentioned above but may be a plastic film made of polyolefin such as polyethylene, polypropylene, polybutene, polybutadiene and polymethyl pentene, polyvinyl chloride, vinyl chloride copolymer, polyethylene terephthalate, polybutylene terephthalate, polyurethane, ethylene-vinyl acetate copolymer, ionomer resin, ethylene-(meth)acrylic acid copolymer, ethylene-(meth)acrylic acid ester copolymer, polystyrene and polycarbonate which has been release-treated with a silicone-based releasing agent, long-chain alkyl-based releasing agent, fluorine-based releasing agent, aliphatic acid amide-based releasing agent, silica-based releasing agent or the like.

The aforementioned cleaning layer exhibits a 180° peel adhesion of 0.20 N/10 mm or less, preferably from about 0.01 to 0.1 N/10 mm with respect to silicon wafer (mirror surface) (measured according to JIS Z0237). When this adhesion exceeds 0.20 N/10 mm, the cleaning layer comes in contact with the area to be cleaned in the device during conveyance, possibly causing troubles in conveyance. The thickness of the cleaning layer is not specifically limited but is normally from about 5 to 100 μm. The release film to be used in the protection of the cleaning layer is not specifically limited but may be a plastic film made of polyolefin such as polyethylene, polypropylene, polybutene, polybutadiene and polymethyl pentene, polyvinyl chloride, vinyl chloride copolymer, polyethylene terephthalate, polybutylene terephthalate, polyurethane, ethylene-vinyl acetate copolymer, ionomer resin, ethylene-(meth)acrylic acid copolymer, ethylene-(meth)acrylic acid ester copolymer, polystyrene and polycarbonate which has been release-treated with a silicone-based releasing agent, long-chain alkyl-based releasing agent, fluorine-based releasing agent, aliphatic acid amide-based releasing agent, silica-based releasing agent or the like.

For the preparation of the label sheet with cleaning function according to the present invention, a cleaning sheet comprising the aforementioned cleaning layer provided on one side of a backing and an ordinary adhesive layer provided on the other side of the backing is used. The adhesive layer on the other side is not specifically limited in its material, etc. so far as the separator of continuous length exhibits the above defined value or more but may be made of an ordinary adhesive (e.g., acrylic adhesive, rubber-based adhesive). In this arrangement, the cleaning label can be peeled off the separator, stuck to conveying members such as various with the ordinary adhesive layer, and then conveyed through the device as a conveying member with cleaning function so that it comes in contact with the site to be cleaned for cleaning. Since the reuse of the conveying member requires that the conveying member be peeled off the adhesive layer, the adhesion of the said adhesive layer can be predetermined to a range of from 0.01 to 10.0 N/10 mm, particularly from about 0.05 to 5.0 N/10 mm as calculated in terms of 180° peel adhesion with respect to silicon wafer (mirror surface) to easily repeel the conveying member off the adhesive layer without being peeled during conveyance after cleaning.

The present invention will be further described in connection with the drawings, but the present invention is not limited thereto.

Figure 2:
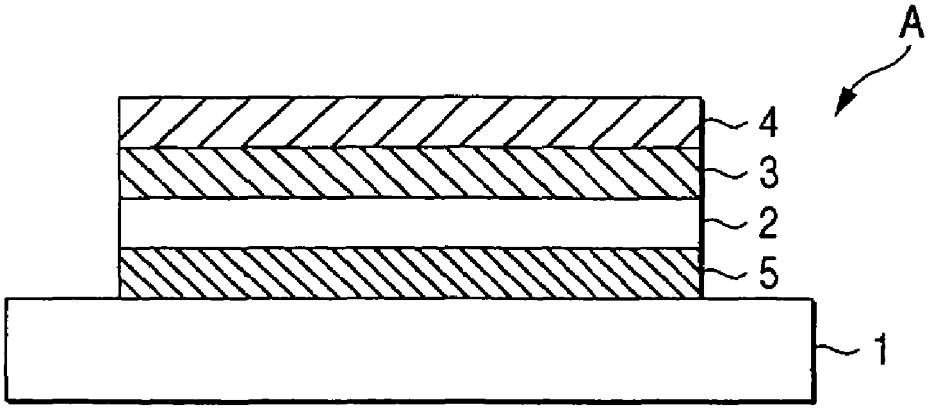
FIG. 2 is a sectional view taken along the line a-a of FIG. 1.

FIG. 1 is a plan view illustrating an example of the label sheet with cleaning function of the present invention wherein a plurality of cleaning labels A are continuously provided on a separator 1 of continuous length apart from each other. As shown in FIG. 2 (sectional view taken in the line a-a of FIG. 1), this label A comprises a cleaning layer 3 and a release film 4 provided on one side of a backing 2 and an ordinary adhesive layer 5 provided on the other side of the backing 2 and is peelably provided on the separator 1 with this adhesive layer 5 interposed therebetween.

In operation, the cleaning label is peeled off the separator 1, and then stuck to a conveying member such as semiconductor wafer. The release film 4 is then peeled off the cleaning layer 3. The label sheet can then be conveyed into a device to clean the site to be cleaned.

In the process for the production of the fourth label sheet with cleaning function of the present invention, it is required that the number of foreign matters having a size of 0.2 μm or more to be transferred from the cleaning layer of the label sheet thus obtained to the silicon wafer be 20 per inch square or less, particularly 10 per inch square or less. If the transferred amount of foreign matters exceeds 20 per inch square, a problem arises that the contact site in the substrate treatment device can be contaminated.

In the present invention, the process for the production of the fourth label sheet is not specifically limited so far as the transferred amount of foreign matters is not greater than the predetermined value as mentioned above. In particular, however, a process is preferably effected which comprises peeling a first release film of the cleaning layer before the polymerization curing reaction of the adhesive of said cleaning layer, subjecting the cleaning layer to polymerization curing under conditions that there are no substantial effect of oxygen, protecting the surface of said cleaning layer by a second release film, and then punching the sheet into a label form. If the adhesive constituting the cleaning sheet has not been polymerized and cured during the sheet punching, it is disadvantageous in that the adhesive layer of the cleaning layer protrudes from the punched section of the sheet or is attached to the punched section or the adhesive ropes or is punched to uneven depth to give roughened punched section, causing malpunching in the worst case. Further, when the polymerization curing reaction is effected after the punching of the sheet, the adhesive exposed on the punched section is prevented from being polymerized due to oxygen inhibition, occasionally causing contamination of the substrate treatment device by the adhesive.

In the present invention, it is preferred that the tensile modules of the cleaning layer be 10 MPa or more, preferably from 10 to 2,000 Mpa (according to JIS K7127) to prevent the occurrence of the aforementioned problems with sheet punching. By predetermining the tensile modulus to such a specified value or more, the protrusion of the adhesive from the cleaning layer or malpunching during sheet punching can be prevented, making it possible to produce a label sheet with cleaning function causing no contamination by adhesive in the precutting process. When the tensile modulus is smaller than 10 MPa, the aforementioned problems with sheet punching can occur or the adhesive can adhere to the area to be cleaned in the device during conveyance, possibly causing troubles in conveyance. On the contrary, when the tensile modulus is too great, the capacity of removing attached foreign matters from the conveyance system is deteriorated.

In the present invention, it is required that the cleaning layer be freed of the first release film before the polymerization curing reaction of the cleaning layer and then subjected to polymerization and curing under conditions that there are no substantial effect of oxygen. When the cleaning layer is subjected to polymerization and curing without being freed of first release film, the constituents of the releasing agent such as silicone which come in contact with the outermost surface of the cleaning layer or part thereof move to the surface of the cleaning layer, giving a cause of contamination from the cleaning layer. Further, the polymerization and curing of the cleaning layer under conditions that there are no substantial effect of oxygen can be accomplished e.g., by irradiation with an activation energy source in vacuum atmosphere (pressure: about 133 Pa).

Further, the cleaning layer which has been subjected to polymerization and curing is protected by a second release film on the surface thereof, and then subjected to sheet punching to make a label form. The first and second release films for protecting the surface of the cleaning layer are not specifically limited so far as they can be re-peeled off the cleaning layer during production or use of the cleaning sheet. However, the plastic film as separator described later or re-releasable adhesive sheet can be used. The first and second release films may be the same or different. However, the production process of the present invention is effective particularly when the first release film is a film with silicone-based releasing agent as described in paragraph (0010).

In accordance with the process for the production of the label sheet with cleaning function of the present invention, a cleaning sheet comprising a cleaning layer made of the aforementioned specific adhesive provided on one side of a backing with the surface thereof protected by a release film wherein the other side of the backing is peelably provided on a separator with an ordinary adhesive layer interposed therebetween is subjected to curing of curing adhesive as cleaning layer, and then subjected to sheet punching on the portion other than separator to make a label form. In this case, the punching process and worked form are not specifically limited. However, the cleaning sheet may be punched according to the shape of the conveying member described later, and then freed of unnecessary sheet to form a label. Alternatively, unnecessary sheet can be peeled off the portion other than label and reinforced portion with a part of the sheet left unpeeled as reinforced portion apart from the label around the label or at the end of the sheet to form a label.

In accordance with the process for the production of the label sheet with cleaning function of the present invention, a cleaning sheet comprising the aforementioned specific cleaning layer provided on one side of a backing wherein the other side of the backing is peelably provided on a separator with an ordinary adhesive layer interposed therebetween is used. The adhesive layer on the other side is not specifically limited in its material, etc. so far as it satisfies the adhesive properties but may be an ordinary adhesive (e.g., acrylic adhesive, rubber-based adhesive). In this arrangement, the label with cleaning function can be peeled off the separator described later, stuck to conveying members such as various with the ordinary adhesive layer, and then conveyed through the device as a conveying member with cleaning function so that it comes in contact with the site to be cleaned for cleaning. In the case where the substrate is peeled off the adhesive layer after cleaning to reuse the conveying member such as the aforementioned substrate, the adhesion of the ordinary adhesive layer is not specifically limited. However, if the adhesion of the ordinary adhesive layer is from 0.01 to 10 N/10 mm, particularly from about 0.1 to 5 N/10 mm as calculated in terms of 180° peel adhesion with respect to silicon wafer (mirror surface), the substrate can be easily re-peeled off the adhesive layer without being peeled during conveyance after cleaning to particular advantage.

In accordance with the process for the production of the label sheet with cleaning function of the present invention, a cleaning sheet comprising a cleaning layer made of the aforementioned specific adhesive provided on one side of a backing with the surface thereof protected by a release film wherein the other side of the backing is peelably provided on a separator with an ordinary adhesive layer interposed therebetween is subjected to curing of curing adhesive as cleaning layer, and then subjected to sheet punching on the portion other than separator to make a label form. In this case, the punching process and worked form are not specifically limited. However, the cleaning sheet may be punched according to the shape of the conveying member described later, and then freed of unnecessary sheet to form a label. Alternatively, unnecessary sheet can be peeled off the portion other than label and reinforced portion with a part of the sheet left unpeeled as reinforced portion apart from the label around the label or at the end of the sheet to form a label.

In accordance with the process for the production of the label sheet with cleaning function of the present invention, a cleaning sheet comprising the aforementioned specific cleaning layer provided on one side of a backing wherein the other side of the backing is peelably provided on a separator with an ordinary adhesive layer interposed therebetween is used. The adhesive layer on the other side is not specifically limited in its material, etc. so far as it satisfies the adhesive properties but may be an ordinary adhesive (e.g., acrylic adhesive, rubber-based adhesive). In this arrangement, the label with cleaning function can be peeled off the separator described later, stuck to conveying members such as various with the ordinary adhesive layer, and then conveyed through the device as a conveying member with cleaning function so that it comes in contact with the site to be cleaned for cleaning. In the case where the substrate is peeled off the adhesive layer after cleaning to reuse the conveying member such as the aforementioned substrate, the adhesion of the ordinary adhesive layer is not specifically limited. However, if the adhesion of the ordinary adhesive layer is from 0.01 to 10 N/10 mm, particularly from about 0.1 to 5 N/10 mm as calculated in terms of 180° peel adhesion with respect to silicon wafer (mirror surface), the substrate can be easily re-peeled off the adhesive layer without being peeled during conveyance after cleaning to particular advantage.

The separator in the present invention is not specifically limited so far as the cleaning label can be peeled off the separator but may be a plastic film made of polyolefin such as polyethylene, polypropylene, polybutene, polybutadiene and polymethyl pentene, polyvinyl chloride, vinyl chloride copolymer, polyethylene terephthalate, polybutylene terephthalate, polyurethane, ethylene-vinyl acetate copolymer, ionomer resin, ethylene-(meth)acrylic acid copolymer, ethylene-(meth)acrylic acid ester copolymer, polystyrene and polycarbonate which has been release-treated with a silicone-based releasing agent, long-chain alkyl-based releasing agent, fluorine-based releasing agent, aliphatic acid amide-based releasing agent, silica-based releasing agent or the like. The thickness of the separator is not specifically limited but is normally from about 10 to 100 μm.

The shape of the label A is not specifically limited and may be circular, wafer-shaped, flame-shaped, shape having protrusions for chuck portion, etc. or the like depending on the shape of the conveying member such as substrate to which the label A is stuck.

The conveying member to which the cleaning sheet or cleaning label is stuck is not specifically limited but may be a flat panel display substrate such as semiconductor wafer, LCD and PDP, substrate such as compact disc and MR head or the like.

EXAMPLES

The present invention will be described in the following examples, but the present invention is not limited thereto. The term “parts” as used hereinafter is meant to indicate “parts by weight”.

Example 1-1

100 parts of an acryl polymer (weight-average molecular weight: 700,000) obtained from a monomer mixture consisting of 75 parts of 2-ethylhexyl acrylate, 20 parts of methyl acrylate and 5 parts of acrylic acid were uniformly mixed with 150 parts of a polyfunctional urethane acrylate (trade name: UV-1700B, produced by Nippon Synthetic Chemical Industry Co., Ltd.), 3 parts of a polyisocyanate compound (trade name: Colonate, produced by Nippon Polyurethane Industry Co., Ltd.) and 10 parts of benzyl dimethyl ketal (trade name: Irgacure 651, produced by Ciba Specialty Chemicals Co., Ltd.) as a photopolymerization initiator to prepare an ultraviolet-curing adhesive solution.

Separately, an adhesive solution obtained in the same manner as mentioned above except that the aforementioned adhesive was free of benzyl dimethyl ketanol was applied to one side of a polyester backing film having a width of 250 mm and a thickness of 25 μm to a dry thickness of 10 μm to provide an ordinary adhesive layer thereon. To the surface of the ordinary adhesive layer was then stuck a polyester-based release film having a thickness of 38 μm which had been release-treated with a silicone-based releasing agent. Subsequently, the previously mentioned ultraviolet-curing adhesive solution was applied to the other side of the backing film to a dry thickness of 15 μm to provide an adhesive layer as a cleaning layer. To the surface of the adhesive layer was then stuck a protective film which had been release-treated with a silicone-based releasing agent as a separator A.

This sheet was then irradiated with an ultraviolet ray having a central wavelength of 365 nm at an integrated dose of 1,000 mJ/cm$^2$.

The separator A, which is a protective film for the cleaning layer, was then peeled off the cleaning sheet A. The amount of silicone attached to the surface of the cleaning layer was then measured. For measurement, a fluorescent X-ray measuring instrument produced by Rigaku Corporation was used. The surface of the cleaning layer was measured for intensity of Si—Kα in an area of 30 mmϕ. The measured value was then subjected to calculation in terms of polydimethylsiloxane. As a result, the intensity of Si—Kα was 4.2 kcps, which is 0.003 g/m$^2$ as calculated in terms of polydimethylsiloxane. Further, the separator A was measured for coated amount of silicone in an area of 30 mm by the fluorescent X-ray measuring instrument. As a result, the intensity of Si—Kα was 104 kcps, which is 0.064 g/m$^2$ as calculated in terms of polydimethylsiloxane.

The tensile modulus of the adhesive layer of this cleaning sheet A after ultraviolet curing was 55 MPa. The tensile modulus was measured according to JIS K7127 testing method.

Further, the adhesive layer on the cleaning layer side was stuck to the mirror surface of a silicon wafer over a width of 10 mm, and then measured for 180° peel adhesion with respect to the silicon wafer (mirror surface) of the ordinary adhesive layer on the cleaning layer side according to JIS Z0237. As a result, it was 0.008 N/10 mm.

Moreover, 180° peel adhesion with respect to the silicon wafer (mirror surface) of the ordinary adhesive layer on the other side was measured in the same manner as mentioned above. As a result, it was 0.85 N/10 mm.

The release film on the ordinary adhesive layer side of this cleaning sheet A was peeled. The cleaning sheet A was then stuck to the back side (mirror surface) of a 8 inch silicon wafer to prepare a conveying cleaning wafer A with cleaning function.

Example 1-2

A cleaning sheet B was prepared in the same manner as in Example 1-1 except that as the separator for protective film of the cleaning layer there was used a separator B release-treated with a silicone-based releasing agent.

The separator B, which is a protective film for the cleaning layer, was then peeled off the cleaning sheet B. The amount of silicone attached to the surface of the cleaning layer was then measured. For measurement, the intensity of Si—Kα was measured in the same manner as in Example 1-1. The measured value was then subjected to calculation in terms of polydimethylsiloxane. As a result, the intensity of Si—Kα was 0.6 kcps, which is less than 0.001 g/m$^2$ as calculated in terms of polydimethylsiloxane. Further, the separator B was measured for coated amount of silicone in the same manner as mentioned above. As a result, the intensity of Si—Kα was 69 kcps, which is 0.042 g/m$^2$ as calculated in terms of polydimethylsiloxane.

Further, a conveying cleaning wafer B with cleaning function was prepared in the same manner as in Example 1-1.

Comparative Example 1-1

A cleaning sheet C was prepared in the same manner as in Example 1-1 except that as the separator for protective film of the cleaning layer there was used a separator C release-treated with a silicone-based releasing agent.

The separator C, which is a protective film for the cleaning layer, was then peeled off the cleaning sheet C. The amount of silicone attached to the surface of the cleaning layer was then measured. For measurement, the intensity of Si—Kα was measured in the same manner as in Example 1-1. The measured value was then subjected to calculation in terms of polydimethylsiloxane. As a result, the intensity of Si—Kα was 9.8 kcps, which is less than 0.006 g/m$^2$ as calculated in terms of polydimethylsiloxane. Further, the separator C was measured for coated amount of silicone in the same manner as mentioned above. As a result, the intensity of Si—Kα was 214 kcps, which is 0.13 g/m$^2$ as calculated in terms of polydimethylsiloxane.

Further, a conveying cleaning wafer C with cleaning function was prepared in the same manner as in Example 1-1.

The aforementioned cleaning sheets A to C of Examples 1-1 and 1-2 and Comparative Example 1-1 were then subjected to contamination test on semiconductor wafer and foreign matter removal test in substrate treatment device by conveying cleaning wafers A to C with cleaning function in the following manner. The results are as set forth in Table 1-1.

<Evaluation of Wafer Contamination>

The cleaning layer of the cleaning sheet was stuck to the entire mirror surface of the 8 inch silicon wafer by a hand roller while the separator (protective film) was being peeled. Thereafter, the cleaning sheet was peeled off the wafer. The foreign matters having a size of 0.2 μm or more attached to the mirror surface were counted by a laser surface inspection device.

<Foreign Matter Removal Test>

Using a laser surface inspection device, foreign matters having a size of 0.2 μm or more on the mirror surface of three sheets of brand-new 8 inch silicon wafer were measured. The results were 4, 5 and 2, respectively. These wafers were then conveyed into separate substrate treatment devices with an electrostatic attraction mechanism with its mirror surface facing downward. The mirror surface of these wafers were then measured by the laser surface inspection device. The results were 33,643, 35,773 and 31,032, respectively, in an area of the 8 inch wafer size.

Subsequently, the protective film on the cleaning layer side was peeled off the conveying cleaning wafers A to C thus obtained. These wafers were then conveyed over the aforementioned substrate treatment device having the wafer stage to which the foreign matters had been attached. As a result, these wafers could be conveyed without any troubles. Thereafter, a brand-new 8 inch silicon wafer was conveyed with its mirror surface facing downward, and then measured for the occurrence of foreign matters having a size of 0.2 μm or more by a laser foreign matter inspection device. This operation was effected five times.

TABLE 1-1

| | Example 1-1 | Example 1-2 | Comparative Example 1-1 |
|---|---|---|---|
| Amount of silicone attached to cleaning layer (g/m$^2$) | 0.003 | Less than 0.001 | 0.006 |
| Coated amount of silicone on separator (g/m$^2$) | 0.064 | 0.042 | 0.133 |
| Number of foreign matters (pieces/8 inch) | 31 | 2 | 443 |
| Percent removal of foreign matters (%/after 5 times of operation) | 85 | 96 | 51 |

As can be seen in the aforementioned results, the cleaning sheets of Examples 1-1 and 1-2 comprising as a separator (protective film) for cleaning layer a protective film release-treated with a silicone-based releasing agent wherein the amount of silicone attached to said cleaning layer when said separator is peeled off said cleaning layer is 0.005 g/m$^2$ or less as calculated in terms of polydimethylsiloxane or the coated amount of silicone on said separator is 0.1 g/m$^2$ or less as calculated in terms of polydimethylsiloxane could prevent the constituents of the silicone-based releasing agent or part thereof from moving to the surface of the cleaning layer. As a result, it was found that the use of these cleaning wafers makes it possible to drastically eliminate contamination on the substrate treatment device, giving a high capacity of removing foreign matters. On the contrary, it was found that the cleaning sheet of Comparative Example 1-1, which falls outside the scope of the present invention, shows a great amount of silicone attached to silicon wafer and, as a result, the use of these cleaning wafers causes back contamination of the device, deteriorating the capacity of removing foreign matters and hence disabling the use thereof.

Example 2-1

100 parts of a low density polyethylene resin produced by ASAHI CHEMICAL INDUSTRY CO., LTD. were extruded free of heat deterioration inhibitor and lubricant through a flat film-producing machine [produced by SHI Modern Machinery, Ltd.] at an extrusion temperature of 200° C. and a take-off speed of 4 m/min to form a film. Thus, a cleaning layer surface protective film A having a thickness of 100 μm was obtained.

100 parts of an acryl polymer (weight-average molecular weight: 700,000) obtained from a monomer mixture of 75 parts of 2-ethylhexyl acrylate, 20 parts of methyl acrylate and 5 parts of acrylic acid were uniformly mixed with 50 parts of a polyethylene glycol 200 dimethacrylate (trade name: Nk Ester 4G, produced by Shinnakamura Kagaku K.K.), 50 parts of urethane acrylate (trade name: U-N-01, produced by Shinnakamura Kagaku K.K.), 3 parts of a polyisocyanate compound (trade name: Colonate L, produced by Nippon Polyurethane Industry Co., Ltd.) and 3 parts of benzyl dimethyl ketal (trade name: Irgacure 651, produced by Ciba Specialty Chemicals Co., Ltd.) as a photopolymerization initiator to prepare an ultraviolet-curing adhesive solution. Separately, an adhesive solution obtained in the same manner as mentioned above except that the aforementioned adhesive was free of benzyl dimethyl ketanol was applied to one side of a polyester backing film having a width of 250 mm and a thickness of 25 μm to a dry thickness of 10 μm to provide an ordinary adhesive layer thereon. To the surface of the ordinary adhesive layer was then stuck a polyester-based release film having a thickness of 38 μm. Subsequently, the previously mentioned ultraviolet-curing adhesive solution was applied to the other side of the backing film to a dry thickness of 40 μm to provide an adhesive layer as a cleaning layer. To the surface of the adhesive layer was then stuck the protective film A prepared above.

This sheet was then irradiated with an ultraviolet ray having a central wavelength of 365 nm at an integrated dose of 2,000 mJ/cm$^2$ to obtain a cleaning sheet A of the present invention. The tensile modulus of the adhesive layer of the cleaning layer of this cleaning sheet A after ultraviolet curing was 55 MPa.

Tensile modulus was measured herein according to JIS K7127 testing method.

Further, the adhesive layer on the cleaning layer side was stuck to the mirror surface of a silicon wafer over a width of 10 mm, and then measured for 180° peel adhesion with respect to the silicon wafer (mirror surface) of the ordinary adhesive layer on the cleaning layer side according to JIS Z0237. As a result, it was 0.029 N/10 mm.

Moreover, 180° peel adhesion with respect to the silicon wafer (mirror surface) of the ordinary adhesive layer on the other side was measured in the same manner as mentioned above. As a result, it was 0.10 N/10 mm.

The release film on the ordinary adhesive layer side of this cleaning sheet A was peeled. The cleaning sheet A was then stuck to the back side (mirror surface) of a 8 inch silicon wafer to prepare a conveying cleaning wafer A with cleaning function.

Example 2-2

To 100 parts of a low density polyethylene resin produced by ASAHI CHEMICAL INDUSTRY CO., LTD. were added 0.009 parts of an aliphatic acid ester-based lubricant. The mixture was then subjected to film forming in the same manner as in Example 1 to obtain a cleaning layer protective film B. A cleaning sheet B and a conveying cleaning wafer B with cleaning function were prepared in the same manner as in Example 2-1 except that the cleaning layer surface protective film B was used as a separator for cleaning layer.

Comparative Example 2-1

To 100 parts of a low density polyethylene resin produced by ASAHI CHEMICAL INDUSTRY CO., LTD. were added 0.01 parts of a phenolic heat deterioration inhibitor and 0.01 parts of an aliphatic acid ester-based lubricant. The mixture was then subjected to film forming in the same manner as in Example 2-1 to obtain a cleaning layer protective film C. A cleaning sheet C and a conveying cleaning wafer C with cleaning function were prepared in the same manner as in Example 2-1 except that the cleaning layer surface protective film C was used as a separator for cleaning layer.

Comparative Example 2-2

To 100 parts of a low density polyethylene resin produced by ASAHI CHEMICAL INDUSTRY CO., LTD. were added 0.1 parts of a phenolic heat deterioration inhibitor and 0.1 parts of an aliphatic acid ester-based lubricant. The mixture was then subjected to film forming in the same manner as in Example 2-1 to obtain a cleaning layer protective film D. A cleaning sheet D and a conveying cleaning wafer D with cleaning function were prepared in the same manner as in Example 2-1 except that the cleaning layer surface protective film D was used as a separator for cleaning layer.

Comparative Example 2-3

A silicone-treated polyester film having a thickness of 50 μm was used as a cleaning layer surface protective film E. A cleaning sheet E and a conveying cleaning wafer E with cleaning function were prepared in the same manner as in Example 2-1 except that the cleaning layer surface protective film E was used as a separator for cleaning layer.

The aforementioned cleaning sheets A to E of Examples 2-1 and 2-2 and Comparative Examples 2-1 to 2-3 were then examined for peel adhesion required to peel the separator (cleaning layer surface protective film) off the cleaning layer. Further, these cleaning sheets A to E were subjected to contamination test on semiconductor wafer and foreign matter removal test in substrate treatment device by conveying cleaning wafers A to E with cleaning function in the following manner. The results are as set forth in Table 2-1.

<Evaluation of Wafer Contamination>

The cleaning layer of the cleaning sheet was stuck to the entire mirror surface of the 8 inch silicon wafer by a hand roller while the separator (protective film) was being peeled. Thereafter, the cleaning sheet was peeled off the wafer. The foreign matters having a size of 0.2 μm or more attached to the mirror surface were counted by a laser surface inspection device.

<Foreign Matter Removal Test>

Using a laser surface inspection device, foreign matters having a size of 0.2 μm or more on the mirror surface of five sheets of brand-new 8 inch silicon wafer were measured. The results were 10, 8, 3, 5, and 11, respectively. These wafers were then conveyed into separate substrate treatment devices with an electrostatic attraction mechanism with its mirror surface facing downward. The mirror surface of these wafers were then measured by the laser surface inspection device. The results were 33,156, 38,945, 32,144, 37,998, and 31,327, respectively, in an area of the 8 inch wafer size.

Subsequently, the protective film on the cleaning side was peeled off the conveying cleaning wafers A to E thus obtained. These wafers were then conveyed over the aforementioned substrate treatment device having the wafer stage to which the foreign matters had been attached. As a result, these wafers could be conveyed without any troubles. Thereafter, a brand-new 8 inch silicon wafer was conveyed with its mirror surface facing downward, and then measured for the occurrence of foreign matters having a size of 0.2 μm or more by a laser foreign matter inspection device. This operation was effected five times.

TABLE 2-1

| | Peel adhesion of separator (N/50 mm width) | Number of foreign matters on wafer (pieces/8 inch) | Percent removal of foreign matters (%/after fives times of operation) |
|---|---|---|---|
| Example 2-1 | 0.2 | 3 | 96 |
| Example 2-2 | 0.15 | 11 | 90 |
| Comparative Example 2-1 | 0.15 | 225 | 76 |
| Comparative Example 2-2 | 0.12 | 2,573 | 55 |
| Comparative Example 2-3 | 0.03 | 9,816 | 32 |

As can be seen in the aforementioned results, the cleaning sheets of Examples 2-1 and 2-2 comprising as a separator (protective film) of the cleaning layer a cleaning layer protective film wherein the sum of the amount of heat deterioration inhibitor and lubricant is less than 0.01 parts based on 100 parts of polyethylene-based resin showed a peel adhesion as small as 0.5 N/50 mm width or less with respect to the surface of the cleaning layer and the separator could be easily peeled off the cleaning layer without any defects such as partial falling of the cleaning layer composition. It was further shown that since the number of foreign matters attached to the silicon wafer was small, the use of these cleaning wafers makes it possible to drastically eliminate contamination on the substrate treatment device, giving a high capacity of removing foreign matters. On the contrary, it was found that the cleaning sheets of Comparative Examples 2-1 and 2-2, which fall outside the scope of the present invention in respect to the above mentioned sum of the amount of the two components, and the cleaning sheet of Comparative Example 2-3, which comprise a conventional silicone-treated polyester film, showed a great amount of foreign matters attached to silicon wafer and, as a result, the use of these cleaning wafers causes back contamination in the device, deteriorating the capacity of removing foreign matters and hence disabling the use thereof.

Example 1-1

100 parts of an acryl polymer (weight-average molecular weight: 700,000) obtained from a monomer mixture consisting of 75 parts of 2-ethylhexyl acrylate, 20 parts of methyl acrylate and 5 parts of acrylic acid were uniformly mixed with 50 parts of a polyethylene glycol 200 dimethacrylate (trade name: NK Ester 4G, produced by Shinnakamura Kagaku K.K.), 50 parts of urethane acrylate (trade name: U-N-01, produced by Shinnakamura Kagaku K.K.), 3 parts of a polyisocyanate compound (trade name: Colonate L, produced by Nippon Polyurethane Industry Co., Ltd.) and 3 parts of benzyl dimethyl ketal (trade name: Irgacure 651, produced by Ciba Specialty Chemicals Co., Ltd.) as a photopolymerization initiator to prepare an ultraviolet-curing adhesive solution A.

Separately, into a 500 ml three-necked flask type reaction vessel equipped with thermometer, agitator, nitrogen intake pipe and condenser were charged 3 parts of 2-ethylhexyl acrylate, 10 parts of n-butyl acrylate, and 15 parts of N,N-dimethylacrylamide, and 0.15 parts of 2,2'-azobisisobutyronitrile and 100 parts of ethyl acetate as polymerization initiators to make 200 g. The reaction mixture was then stirred while nitrogen gas was being introduced thereinto for about 1 hour to replace the air within by nitrogen. Thereafter, the internal temperature of the reaction vessel was raised to 58° C. where the reaction mixture was then kept for about 4 hours to cause polymerization. As a result, an adhesive polymer solution was obtained. 100 parts of the adhesive polymer solution were then uniformly mixed with 3 parts of a polyisocyanate compound (trade name: Colonate L, produced by Nippon Polyurethane Industry Co., Ltd.) to obtain an adhesive solution A.

The aforementioned adhesive solution A was applied to the release-treated surface of the separator A made of a polyester film of continuous length (thickness: 38 μm; width: 250 mm) one side of which had been treated with a silicone-based releasing agent to a dry thickness of 15 μm. On the adhesive layer was then laminated a polyester film of continuous length (thickness: 25 μm; width: 250 mm). The ultraviolet-curing adhesive solution A was then applied to the film to a dry thickness of 40 μm to provide an adhesive layer as a cleaning layer. To the surface of the adhesive layer was then stuck the release-treated surface of the same release film as mentioned above to obtain a sheet.

This sheet was then irradiated with an ultraviolet ray having a central wavelength of 365 nm at an integrated dose of 1,000 mJ/cm$^2$ to obtain a cleaning sheet A having an ultraviolet-cured cleaning layer.

The adhesive film which is a laminated material other than the separator on the adhesive layer side of this cleaning sheet A was then punched in the form of circle having a diameter of 200 mm. The unnecessary adhesive film was then continuously peeled and removed to prepare a label sheet A with cleaning function of the present invention as shown in FIG. 1. The punching of this label sheet A with cleaning function was conducted without any problems of roping of adhesive or chipping. After preparation, the label sheet A with cleaning function was observed. As a result, no peeling of the cleaning label off the separator occurred, and the cleaning label was retained on the separator. Further, there were observed neither protrusion of the ordinary adhesive from the end of the label nor contamination of the label by the adhesive. Further, the label sheet A was stored for 1 month. However, no peeling of the label off the separator occurred, demonstrating that the cleaning sheet A exhibits a high age stability.

This label sheet A with cleaning function was measured for 180° peel adhesion required to peel the separator off the cleaning label. It was 0.1 N/50 mm. The measurement of the peel adhesion of the separator was carried out by determining the force required to peel the separator off the cleaning label at an angle of 180° and a rate of 300 mm/min in an ordinary state (23° C., 50% RH) using a tensile testing machine (specified in AS1635, FINAT-10, FS-147, PSTC-4).

Further, percent residual adhesion was measured using a No. 31 B tape (polyester adhesive tape) produced by NITTO DENKO CORPORATION. In some detail, a No. 31 B tape was stuck to a stainless steel plate (SUS304) specified in JIS G 4305. The peel adhesion (basic adhesion) was then measured. The basic adhesion was 5.2 N/20 mm. Subsequently, the separator A was stuck to the adhesive surface of the No. 31B tape using a 19.6 N (2 kg) roller. The laminate was then pressed at a load of 49 N (5 kg). After 24 hours, the adhesive tape was then peeled. The adhesive tape thus peeled was then stuck to the aforementioned stainless steel plate. The peel adhesion was then measured in the same manner as mentioned above to determine residual adhesion. The residual adhesion was 5.4 N/20 mm and the percent residual adhesion was 104%.

This ultraviolet-curing adhesive A was measured for tensile modulus (JIS K7127 testing method). As a result, it was 49 Mpa after irradiated with an ultraviolet ray having a central wavelength of 365 nm at an integrated dose of 1,000 mJ/cm$^2$.

The 180° peel adhesion of this ordinary adhesive layer with respect to silicon wafer (mirror surface) was 0.25 N/10 mm.

This label sheet A with cleaning function was stuck to a 8 inch silicon wafer using a label sticker (NEL-GR3000, produced by NITTO SEIKI INC.) to prepare a conveying member A with cleaning function. At this time, the cleaning label was stuck to the mirror surface of the 8 inch silicon wafer. This operation was continuously effected over 25 sheets. As a result, the sheet was stuck to the wafer without any problems. Thus, a conveying member A with cleaning function for conveyance with cleaning function was prepared.

Separately, using a laser surface inspection device, foreign matters having a size of 0.2 μm or more on the mirror surface of four sheets of brand-new 8 inch silicon wafer were measured. The first sheet showed 5 pieces of foreign maters, the second sheet showed 3 pieces of foreign maters, and the third sheet showed 5 pieces of foreign maters. These wafers were then conveyed into separate substrate treatment devices with an electrostatic attraction mechanism with its mirror surface facing downward. The mirror surface of these wafers were then measured for foreign matters having a size of 0.2 or more by the laser surface inspection device. The first, second and third sheets showed 29,845, 32,194 and 30,036 pieces of foreign matters, respectively, in an area of the 8 inch wafer size.

Subsequently, the release film on the cleaning side was peeled off the conveying member A with cleaning function for conveyance thus obtained. The conveying member A was then conveyed over the aforementioned substrate treatment device having the wafer stage to which 29,845 pieces of foreign matters had been attached. As a result, the conveying member could be conveyed without any troubles. Thereafter, a brand-new 8 inch silicon wafer was conveyed with its mirror surface facing downward, and then measured for the occurrence of foreign matters having a size of 0.2 μm or more by a laser foreign matter inspection device. This operation was effected five times. The results are set forth in Table 3-1.

Example 3-2

A label sheet B with cleaning function was prepared in the same manner as in Example 3-1 except that as the separator of continuous length for label sheet with cleaning function there was a polyolefin film B (thickness: 70 μm; width: 250 mm) made of a low density polyethylene. The punching of this label sheet B with cleaning function was conducted without any problems of roping of adhesive or chipping. After preparation, the label sheet B with cleaning function was observed. As a result, no peeling of the cleaning label off the separator occurred, and the cleaning label was retained on the separator. Further, there were observed neither protrusion of the ordinary adhesive from the end of the label nor contamination of the label by the adhesive. Further, the label sheet B was stored for 1 month. However, no peeling of the label off the separator occurred, demonstrating that the cleaning sheet B exhibits a high age stability.

This label sheet B with cleaning function was measured for 180° peel adhesion required to peel the separator off the cleaning label. It was 0.15 N/50 mm.

Further, the separator B was measured for residual adhesion by No. 31B tape. The residual adhesion was 4.7 N/20 mm and the percent residual adhesion was 90%.

This label sheet B with cleaning function was stuck to a 8 inch silicon wafer using a label sticker (NEL-GR3000, produced by NITTO SEIKI INC.) to prepare a conveying member B with cleaning function. At this time, the cleaning label was stuck to the mirror surface of the 8 inch silicon wafer. This operation was continuously effected over 25 sheets. As a result, the sheet was stuck to the wafer without any problems. Thus, a conveying member B with cleaning function for conveyance with cleaning function was prepared.

Subsequently, the release film on the cleaning side was peeled off the conveying member A with cleaning function for conveyance obtained previously. The conveying member A was then conveyed over the aforementioned substrate treatment device having the wafer stage to which 32,194 pieces of foreign matters had been attached. As a result, the conveying member could be conveyed without any troubles. Thereafter, a brand-new 8 inch silicon wafer was conveyed with its mirror surface facing downward, and then measured for the occurrence of foreign matters having a size of 0.2 μm or more by a laser foreign matter inspection device. This operation was effected five times. The results are set forth in Table 3-1.

Comparative Example 3-1

A label sheet C with cleaning function was prepared in the same manner was in Example 3-1 except that as the separator of continuous length for label sheet with cleaning function there was a polyester film C (thickness: 38 μm; width: 250 mm). The punching of this label sheet C with cleaning function was Conducted without any problems of roping of adhesive or chipping.

However, when the label sheet C with cleaning function was observed after preparation, almost all the cleaning labels were observed to have been peeled off the separator, demonstrating that the label sheet was not prepared.

This label sheet C with cleaning function was measured for 180° peel adhesion required to peel the separator off the cleaning label. As a result, the dispersion of peel adhesion was great among the labels to be measured. The 180° peel adhesion was 0.03 N/50 mm at maximum.

Further, the separator B was measured for residual adhesion by No. 31B tape. The residual adhesion was 4.0 N/20 mm and the percent residual adhesion was 77%.

This label sheet C with cleaning function was stuck to a 8 inch silicon wafer using a label sticker (NEL-GR3000, produced by NITTO SEIKI INC.) to prepare a conveying member C with cleaning function. At this time, the cleaning label was stuck to the mirror surface of the 8 inch silicon wafer. This operation was continuously effected over 25 sheets. As a result, the cleaning label was completely peeled off the separator by the sticker, causing frequent malsticking to wafer. Even the conveying member C with cleaning function which could be stuck to wafer had air bubbles (float) mixed therein during sticking, making it impossible to obtain a single good product. Accordingly, cleaning of the interior of the substrate treatment device by the conveying member C with cleaning function was suspended.

TABLE 3-1

| | Percent removal of foreign matters | | | | |
|---|---|---|---|---|---|
| | 1 sheet conveyed | 2 sheets conveyed | 3 sheets conveyed | 4 sheets conveyed | 5 sheets conveyed |
| Example 3-1 | 83% | 88% | 90% | 92% | 92% |
| Example 3-2 | 80% | 85% | 90% | 92% | 92% |
| Comparative Example 3-1 | Cleaning suspended | | | | |

Example 4-1

100 parts of an acryl polymer (weight-average molecular weight: 700,000) obtained from a monomer mixture consisting of 75 parts of 2-ethylhexyl acrylate, 20 parts of methyl acrylate and 5 parts of acrylic acid were uniformly mixed with 50 parts of a polyethylene glycol 200 dimethacrylate (trade name: NK Ester 4G, produced by Shinnakamura Kagaku K.K.), 50 parts of urethane acrylate (trade name: U-N-01, produced by Shinnakamura Kagaku K.K.), 3 parts of a polyisocyanate compound (trade name: Colonate L, produced by Nippon Polyurethane Industry Co., Ltd.) and 3 parts of benzyl dimethyl ketal (trade name: Irgacure 651, produced by Ciba Specialty Chemicals Co., Ltd.) as a photopolymerization initiator to prepare an ultraviolet-curing adhesive solution.

Separately, an ordinary adhesive solution was obtained in the same manner as mentioned above except that the aforementioned adhesive was free of benzyl dimethyl ketal.

The aforementioned adhesive solution was applied to the release-treated surface of the separator made of a polyester film of continuous length (thickness: 38 μm; width: 250 mm) one side of which had been treated with a silicone-based releasing agent to a dry thickness of 10 μm. On the adhesive layer was then laminated a polyester film of continuous length (thickness: 25 μm; width: 250 mm). The ultraviolet-curing adhesive solution was then applied to the film to a dry thickness of 40 μm to provide an adhesive layer as a cleaning layer. After drying, to the surface of the adhesive layer was then stuck the release-treated surface of a first release film made of polyester film of continuous length (thickness: 38 μm; width: 250 mm) one side of which had been treated with a silicone-based releasing agent to obtain a sheet.

The first release film on the cleaning layer of this sheet was peeled. The sheet was then irradiated with an ultraviolet ray having a central wavelength of 365 nm at an integrated dose of 1,000 mJ/cm$^2$ in a vacuum atmosphere (133 Pa). To the surface of the cleaning layer was then stuck a polyolefin film (untreated) having a thickness of 50 μm as a second release film to obtain a cleaning sheet having an ultraviolet-cured cleaning layer.

The adhesive film which is a laminated material other than the separator of this cleaning sheet was then punched in the form of circle having a diameter of 200 mm. The unnecessary adhesive film was then continuously peeled and removed to prepare a cleaning label sheet of the present invention as shown in FIG. 1. The punching of this cleaning sheet was conducted without any problems of roping of adhesive or chipping. After preparation, the label sheet was observed. As a result, there were observed neither protrusion of the ordinary adhesive from the end of the label nor contamination of the label by the adhesive.

Further, the tensile modulus of the cleaning layer of this cleaning sheet after curing, i.e., during sheet punching was 49 MPa. The tensile modulus was measured herein according to JIS K7127 testing method.

Moreover, the second release film on the cleaning layer of this cleaning label sheet was peeled. The cleaning label sheet was then stuck to a 8 inch silicon wafer in such an arrangement that the cleaning layer came in contact with the wafer. The label sheet was then peeled off the wafer. The surface of the 8 inch silicon wafer was measured y a laser type foreign matter measuring instrument. As a result, the number of foreign matters having a size of 0.2 μm or more was 14.

The cleaning label was peeled off the separator of the label sheet with cleaning function thus obtained, and then stuck to the back surface (mirror surface) of a 8 inch silicon wafer by a hand roller to prepare a conveying cleaning wafer with cleaning function. The 180° peel adhesion of the ordinary adhesive layer with respect to silicon wafer (mirror surface) was 2.5 N/10 mm.

Using this label sheet with cleaning function, the label was stuck to the back surface (mirror surface) of a 8 inch silicon wafer by a label tape sticker (trade name: NEL-GR3000, produced by NITTO SEIKI INC.). This operation was continuously conducted over 25 sheets. As a result, sheets could be stuck to wafer without any problems, making it possible to prepare a conveying cleaning wafer with cleaning function. Further, the cleaning layer was stuck to the mirror surface of a silicon wafer over a width of 10 mm, and then measured for 180° peel adhesion with respect to the silicon wafer according to JIS Z0237. As a result, it was 0.018 N/10 mm.

Separately, using a laser surface inspection device, foreign matters having a size of 0.2 μm or more on the mirror surface of four sheets of brand-new 8 inch silicon wafer were measured. The first sheet showed 6 pieces of foreign maters, and the second sheet showed 5 pieces of foreign maters. These wafers were then conveyed into separate substrate treatment devices with an electrostatic attraction mechanism with its mirror surface facing downward. The mirror surface of these wafers were then measured for foreign matters having a size of 0.2 μm or more by the laser surface inspection device. The first and second sheets showed 33,456 and 36,091 pieces of foreign matters, respectively, in an area of the 8 inch wafer size.

Subsequently, the second release film on the cleaning layer side was peeled off the conveying cleaning wafer thus obtained. The cleaning wafer was then conveyed over the aforementioned substrate treatment device having the wafer stage to which 33,456 pieces of foreign matters had been attached. As a result, the cleaning wafer could be conveyed without any troubles. Thereafter, a brand-new 8 inch silicon wafer was conveyed with its mirror surface facing downward, and then measured for the occurrence of foreign matters having a size of 0.2 μm or more by a laser foreign matter inspection device. This operation was effected five times. The percent removal of foreign matters are set forth in Table 4-1.

Comparative Example 4-1

A cleaning sheet was prepared in the same manner as in Example 4-1 except that the sheet was irradiated with an ultraviolet ray having a central wavelength of 365 nm at an integrated dose of 1,000 mJ/cm$^2$ in the atmosphere with the first release film left unpeeled off the cleaning layer. The second release film was then peeled off the cleaning layer of this cleaning label sheet. The cleaning label sheet was then stuck to a 8 inch silicon wafer in such an arrangement that the cleaning layer comes in contact with the wafer. The cleaning label sheet was then peeled off the wafer. The surface of the 8 inch silicon wafer was then measured by a laser type foreign matter measuring instrument. As a result, the number of foreign matters having a size of 0.2 μm or more was 6,264. A cleaning wafer was then obtained from this cleaning sheet in the same manner as in the example.

Subsequently, the second release film on the cleaning layer side was peeled off the conveying cleaning wafer thus obtained. The cleaning wafer was then conveyed over the aforementioned substrate treatment device having the wafer stage to which 36,091 pieces of foreign matters had been attached. As a result, the cleaning wafer could be conveyed without any troubles. Thereafter, a brand-new 8 inch silicon wafer was conveyed with its mirror surface facing downward, and then measured for the occurrence of foreign matters having a size of 0.2 μm or more by a laser foreign matter inspection device. This operation was effected five times. The percent removal of foreign matters are set forth in Table 4-1.

Comparative Example 4-1

A cleaning sheet was prepared in the same manner as in Example 4-1 except that the cleaning sheet was not irradiated with an ultraviolet ray having a central wavelength of 365 nm at an integrated dose of 1,000 mJ/cm$^2$. This cleaning sheet was then cut by punching into a circle having a diameter of 200 mm in the same manner as in Example 4-1 to prepare a label sheet with cleaning function. During this procedure, the cleaning layer didn't yet cure and thus acted as a cushioning material. Thus, since punching couldn't be conducted to a uniform depth, much malpunching of label occurred. Further, the label thus prepared was observed. As a result, the adhesive was observed to have protruded from the end of the label. Moreover, there was observed on the label much stain of adhesive due to roping of adhesive developed during punching. Further, the adhesive extended and adhered to the second release film on the cleaning layer side at the end of the label. The label thus prepared was irradiated with an ultraviolet ray having a central wavelength of 365 nm at an integrated dose of 1,000 mJ/cm$^2$. However, the adhesive at the end of the label didn't cure due to oxygen inhibition and stayed adhesive. Accordingly, the preparation of the conveying cleaning wafer from this label sheet was suspended.

TABLE 4-1

| | Percent removal of foreign matters | | | | |
|---|---|---|---|---|---|
| | 1 sheet conveyed | 2 sheets conveyed | 3 sheets conveyed | 4 sheets conveyed | 5 sheets conveyed |
| Example 4-1 | 80% | 88% | 90% | 92% | 92% |
| Comparative Example 4-1 | 80% | 82% | 82% | 80% | 78% |
| Comparative Example 4-2 | Cleaning suspended | | | | |

INDUSTRIAL APPLICABILITY

As mentioned above, in the first invention, by predetermining the cleaning layer surface protective film (separator) of the cleaning sheet such that the amount of silicone attached to said cleaning layer when the cleaning layer surface protective film is peeled off the cleaning layer or the coated amount of silicone on the separator is not greater than a specified value, the cleaning sheet can be applied to a process for the removal of foreign matters from the conveying site, etc. in a substrate treatment device to prevent a problem of contamination in the device due to protective film and give a high capacity of removing foreign matters.

Further, in the second invention, by forming the cleaning layer surface protective film (separator) of the cleaning sheet by a polyolefin-based resin which has not been release-treated and arranging such that the amount of heat deterioration inhibitor and lubricant incorporated in the surface protective film is not greater than a specified value, the cleaning sheet can be applied to a process for the removal of foreign matters from the conveying site, etc. in a substrate treatment device to prevent a problem of contamination in the device due to protective film and give a high capacity of removing foreign matters.

Moreover, the label sheet with cleaning function of the third invention can provide a label sheet with cleaning function which is not subject to peeling of cleaning label off separator and exhibits a high age stability as well as a cleaning conveying member which can be certainly conveyed through a substrate treatment device to simply and certainly remove foreign matters attached to the interior of the device.

Further, in accordance with the process for the production of label sheet with cleaning function of the fourth invention, a cleaning label sheet which is not subject to malpunching during sheet punching into label form and causes no stain of adhesive can be produced. At the same time, a label sheet with cleaning function which can be certainly conveyed through a substrate treatment device to simply and certainly remove foreign matters attached to the interior of the device.

The invention claimed is:

1. A cleaning sheet comprising:

a cleaning layer; and a protective film comprising a polyolefin resin, a heat deterioration inhibitor and a lubricant, the protective film being provided as a separator on at least one side of the cleaning layer, and the protective film being not treated with a releasing agent, wherein a total amount of the heat deterioration inhibitor and the lubricant is less than 0.01 parts by weight based on 100 parts by weight of the polyolefin resin.

2. A cleaning sheet comprising:

a cleaning layer;

a protective film comprising a polyolefin resin, a heat deterioration inhibitor and a lubricant, the protective film being provided as a separator on one side of the cleaning layer, and the protective film being not treated with a releasing agent; and an adhesive layer provided on the other side of the cleaning layer, wherein a total amount of the heat deterioration inhibitor and the lubricant is less than 0.01 parts by weight based on 100 parts by weight of the polyolefin resin.

3. A cleaning sheet comprising:

a backing;

a cleaning layer provided on at least one side of the backing; and a protective film comprising a polyolefin resin, a heat deterioration inhibitor and a lubricant, the protective film being provided as a separator on the cleaning layer, and the protective film being not treated with a releasing agent, wherein a total amount of the heat deterioration inhibitor and the lubricant is less than 0.01 parts by weight based on 100 parts by weight of the polyolefin resin.

4. A cleaning sheet comprising:

a backing;

a cleaning layer provided on one side of the backing;

an adhesive layer provided on the other side of the backing; and a protective film comprising a polyolefin resin, a heat deterioration inhibitor and a lubricant, the protective film being provided as a separator at least on the cleaning layer, and the protective film being not treated with a releasing agent, wherein a total amount of the heat deterioration inhibitor and the lubricant is less than 0.01 parts by weight based on 100 parts by weight of the polyolefin resin.

5. The cleaning sheet according to any one of claims 1 to 4, wherein the protective film does not comprise the heat deterioration inhibitor and the lubricant.

6. A cleaning sheet comprising:

a cleaning layer; and a protective film treated with a releasing agent comprising a silicone, the protective film being provided as a separator on at least one side of the cleaning layer, wherein the separator has a silicone coated in an amount of less than 0.1 g/$m^2$ as calculated in terms of polydimethylsiloxane, wherein an amount of silicone attached to the cleaning layer when the separator is peeled off from the cleaning layer is 0.005 g/$m^2$ or less as calculated in terms of polydimethylsiloxane, and wherein the tensile modulus of the cleaning layer according to the JIS K7127 method is 10 MPa or more, and wherein the 180° peel adhesion of the cleaning layer with respect to a silicon wafer is 0.010 to 0.20 N/10 mm according to the JIS Z0237 method.

7. The process according to claim 6, wherein the cleaning layer comprises an adhesive which is polymerized and is cured by an activation energy.

8. A cleaning sheet comprising:

a cleaning layer;

a protective film treated with a releasing agent comprising a silicone, the protective film being provided as a separator on one side of the cleaning layer; and an adhesive layer provided on the other side of the cleaning layer, wherein the separator has a silicone coated in an amount of less than 0.1 g/$m^2$ as calculated in terms of polydimethylsiloxane, wherein an amount of silicone attached to the cleaning layer when the separator is peeled off from the cleaning layer is 0.005 g/$m^2$ or less as calculated in terms of polydimethylsiloxane, and wherein the tensile modulus of the cleaning layer according to the JIS K7127 method is 10 MPa or more, and wherein the 180° peel adhesion of the cleaning layer with respect to a silicon wafer is 0.010 to 0.20 N/10 mm according to the JIS Z0237 method.

9. The process according to claim 8, wherein the cleaning layer comprises an adhesive which is polymerized and is cured by an activation energy.

10. A cleaning sheet comprising:

a backing;

a cleaning layer provided on at least one side of the backing; and a protective film treated with a releasing agent comprising a silicone, the protective film being provided as a separator on the cleaning layer, wherein the separator has a silicone coated in an amount of less than 0.1 g/$m^2$ as calculated in terms of polydimethylsiloxane, wherein an amount of silicone attached to the cleaning layer when the separator is peeled off from the cleaning layer is 0.005 g/$m^2$ or less as calculated in terms of polydimethylsiloxane, and wherein the tensile modulus of the cleaning layer according to the JIS K7127 method is 10 MPa or more, and wherein the 180° peel adhesion of the cleaning layer with respect to a silicon wafer is 0.010 to 0.20 N/10 mm according to the JIS Z0237 method.

11. The process according to claim 10, wherein the cleaning layer comprises an adhesive which is polymerized and is cured by an activation energy.

12. A cleaning sheet comprising:

a backing;

a cleaning layer provided on one side of the backing;

an adhesive layer provided on the other side of the backing; and a protective film treated with a releasing agent comprising a silicone, the protective film being provided as a separator at least on the cleaning layer, wherein the separator has a silicone coated in an amount of less than 0.1 g/$m^2$ as calculated in terms of polydimethylsiloxane, wherein an amount of silicone attached to the cleaning layer when the separator is peeled off from the cleaning layer is 0.005 g/$m^2$ or less as calculated in terms of polydimethylsiloxane, wherein the tensile modulus of the cleaning layer according to the JIS K7127 method is 10 MPa or more, and wherein the 180° peel adhesion of the cleaning layer with respect to a silicon wafer is 0.010 to 0.20 N/10 mm according to the JIS Z0237 method.

13. The process according to claim 12, wherein the cleaning layer comprises an adhesive which is polymerized and is cured by an activation energy.

14. A conveying member with cleaning function comprising a conveying member, a cleaning sheet according to any one of claims 8, 12, 2 and 4 provided on the conveying member with an adhesive layer interposed therebetween.

15. A process for cleaning a substrate treatment device, the process comprising:

peeling off the protective film of the cleaning sheet according to any one of claims 6, 10, 1 and 3 or the conveying member according to claim 14; and conveying the cleaning sheet or the conveying member into a substrate treatment device after the peeling.

16. A label sheet with cleaning function comprising:

a backing;

a cleaning layer provided on one side of the backing;

a release film provided on the cleaning layer;

a separator; and an at least one adhesive layer provided on the other side of the backing, and provided on the separator at a condition that the separator is capable of being peeled off from the adhesive layer, wherein at least one of the adhesive layers are continuously provided apart from each other on one separator, 180° peel adhesion required to peel off the separator from the adhesive layer is 0.05 N/50 mm or more, and wherein the tensile modulus of the cleaning layer according to the JIS K7127 method is 10 MPa or more, and wherein the 180° peel adhesion of the cleaning layer with respect to a silicon wafer is 0.010 to 0.20 N/10 mm according to the JIS Z0237 method.

17. The label sheet with cleaning function according to claim 16, wherein the cleaning layer comprises a curing adhesive comprising: a pressure-sensitive adhesive polymer; a polymerizable unsaturated compound having one or more unsaturated double bonds per molecule; and a polymerization initiator.

18. The label sheet with cleaning function according to claim 16, wherein the cleaning layer comprises a curing adhesive comprising: a pressure-sensitive adhesive polymer; a polymerizable unsaturated compound having one or more unsaturated double bonds per molecule; and a polymerization initiator, and the pressure-sensitive adhesive is an acrylic polymer comprising a (meth)acrylic acid alkylester.

19. The label sheet with cleaning function according to claim 16, wherein the cleaning layer comprises a curing adhesive comprising: a pressure-sensitive adhesive polymer; a polymerizable unsaturated compound having one or more unsaturated double bonds per molecule; and a polymerization initiator, and the polymerization initiator is a photopolymerization initiator and the cleaning layer is a photo-curing adhesive layer.

20. The process according to claim 16, wherein the cleaning layer comprises an adhesive which is polymerized and is cured by an activation energy.

21. A process for the production of a label sheet with cleaning function, the process comprising:

providing a cleaning layer on one side of a backing, the cleaning layer having a release film at a surface thereof, and the cleaning layer comprising an adhesive which is polymerized and is cured by an activation energy; and providing at least one adhesive layer between the backing and a separator at a condition that the separator is capable of being peeled off from the at least one adhesive layer, the at least one adhesive layer being on the other side of the backing;

peeling off a first release film from the cleaning layer before the polymerizing and curing of the adhesive;

subjecting the cleaning layer to the polymerizing and curing under a condition that there are no substantial effect of oxygen;

protecting a surface of the cleaning layer by a second release film after the subjecting; and punching the obtained laminate of the cleaning layer, the backing, the adhesive layer and the second release film into a label form, wherein an amount of foreign matters having a size of 0.2 μm or more transferred from the cleaning layer to a silicon wafer is 20 pieces/in$^2$ or less, wherein the tensile modulus of the cleaning layer during the punching according to JIS K7127 testing method is 10 MPa or more, and wherein the 180° peel adhesion of the cleaning layer with respect to a silicon wafer is 0.010 to 0.20 N/10 mm according to the JIS Z0237 method.

22. The process according to claim 21, wherein the first release film is a film with a releasing agent comprising a silicone.

23. The process according to claim 21, wherein the cleaning layer comprises a curing adhesive comprising: a pressure-sensitive adhesive polymer; a polymerizable unsaturated compound having one or more unsaturated double bonds per molecule; and a polymerization initiator.

24. The process according to claim 23, wherein the pressure-sensitive adhesive polymer is an acrylic polymer comprising at least one of a (meth)acrylic acid and a (meth)acrylic acid alkylester.

25. The process according to claim 23, wherein the polymerization initiator is a photopolymerization initiator and the cleaning layer is a photo-curing adhesive layer.

26. The process according to claim 21, wherein at least one of the adhesive layers are continuously provided apart from each other on a separator.

* * * * *